US007631301B2

(12) United States Patent
Fortier

(10) Patent No.: US 7,631,301 B2
(45) Date of Patent: *Dec. 8, 2009

(54) CUSTOMIZING BINARY CONTENT FILES

(75) Inventor: Dominique Fortier, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 287 days.

This patent is subject to a terminal disclaimer.

(21) Appl. No.: 11/351,740

(22) Filed: Feb. 10, 2006

(65) Prior Publication Data

US 2006/0130024 A1    Jun. 15, 2006

Related U.S. Application Data

(63) Continuation of application No. 10/008,971, filed on Dec. 6, 2001, now Pat. No. 7,073,168.

(51) Int. Cl.
G06F 9/45 (2006.01)
G06F 9/44 (2006.01)

(52) U.S. Cl. .................. 717/140; 717/143; 717/148

(58) Field of Classification Search ........... 717/100, 717/133, 114–116, 136–140, 146–148
See application file for complete search history.

(56) References Cited

U.S. PATENT DOCUMENTS

| 5,204,960 | A |   | 4/1993  | Smith et al.    |         |
|-----------|---|---|---------|-----------------|---------|
| 5,675,804 | A | * | 10/1997 | Sidik et al.    | 717/139 |
| 5,694,566 | A |   | 12/1997 | Nagae           |         |
| 5,909,577 | A | * | 6/1999  | Devanbu         | 717/127 |
| 5,978,587 | A | * | 11/1999 | Baisley et al.  | 717/144 |
| 6,083,276 | A | * | 7/2000  | Davidson et al. | 717/107 |
| 6,266,811 | B1| * | 7/2001  | Nabahi          | 717/174 |
| 6,305,010 | B2| * | 10/2001 | Agarwal         | 717/126 |
| 6,430,739 | B1| * | 8/2002  | Ballard         | 717/100 |
| 6,581,206 | B2| * | 6/2003  | Chen            | 717/143 |
| 6,671,873 | B2| * | 12/2003 | Milobinski et al.| 717/124 |
| 6,684,389 | B1| * | 1/2004  | Tanaka et al.   | 717/140 |
| 6,691,307 | B2| * | 2/2004  | Long            | 717/159 |

(Continued)

FOREIGN PATENT DOCUMENTS

WO        WO 99/04336        1/1999

OTHER PUBLICATIONS

Wang et al, "Jato: A compact binary file format for Java class", IEEE, pp. 467-474, 2001.*

(Continued)

*Primary Examiner*—Anil Khatri
(74) *Attorney, Agent, or Firm*—Workman Nydegger

(57) ABSTRACT

Customizing a binary content file without having to recompile source code associated with the binary content file. A variable initialization module receives a binary content file and a script file. Included in the binary content file are current values for one or more variables. Included in the script file are updated values for the one or more variables. The variable initialization module processes the script file to overwrite the current values for the one or more variables with the updated values for the one or more variables. Variables are updated directly in the binary content file. Variables included in a script file may be identified from associated map files or by a scanner module that scans binary content files. Script files may include conditional statements for updating values differently depending on the configuration of a destination computing device.

13 Claims, 5 Drawing Sheets

U.S. PATENT DOCUMENTS

| | | | | |
|---|---|---|---|---|
| 6,745,383 | B1* | 6/2004 | Agarwal et al. | 717/132 |
| 6,813,762 | B1* | 11/2004 | Plaxton | 717/148 |
| 6,915,509 | B1* | 7/2005 | Chkodrov et al. | 717/124 |
| 7,444,625 | B2* | 10/2008 | Anwar et al. | 717/140 |
| 7,506,320 | B2* | 3/2009 | Bhandari et al. | 717/133 |
| 7,512,616 | B2* | 3/2009 | Corcoran et al. | 707/101 |
| 7,565,640 | B2* | 7/2009 | Shukla et al. | 717/105 |

OTHER PUBLICATIONS

Quinian et al, "Source code and binary analysis of software defects", ACM, pp. 1-14, 2009.*

Yardimici et al, "Mostaly statis program partitioning of binary executables", ACM Trans. on Prog. Langugaes and Systems, vol. 31, No. 5, article 17, pp. 1-46, 2009.*

Chalin et al, "An integrated verification environments for JML: Architecture and early results", ACM SAVCBS, pp. 47-53, 2007.*

Baker, Brenda S., et al. "Compressing Differences of Executable Code", Workshop on Compiler Support for System Software and ACM Sigplan, Apr. 22, 1999.

Keller, Ralph., et al., "Binary Component Adaptation", ECOOP '98 Object-Oriented Programming. 12th European Conference Proceedings, Springer-Verlag Heidelberg Berlin, Germany, 1998.

Hicks, Michael., et al., "Dynamic Software Updating", Sigplan Notices ACM USA, vol. 36, No. 5, May 2001.

Srivastava, Amitabh, et al., "Vulcan Binary transformation in a distributed environment", Technical Report, Microsoft Research, Redmond, Washington, Apr. 20, 2001. Retrieved from the Internet: URL: ftp://ftp.research.microsoft.com/pub/tr/tr-2001-50.pdf.

* cited by examiner

```
[01]  IF IMGAUTH
[02]    DEFINE DEVAUTH        802B0000
[03]    DEFINE DEVAUTHLEN     00000080
[04]
[05]    RESERVE DEVAUTH       DEVAUTHLEN; KEYEDDEVID
[06]  ENDIF; IMGAUTH
[07]
[08]  DEFINE NKSTART          800040000   ; where NK (KERNEL) starts
[09]
[10]  IF IMG32BIT
[11]    DEFINE NKLEN          01FC0000    ; len of NK (KERNEL)
[12]  ENDIF
[13]  IF IMG32BIT !
[14]    DEFINE NKLEN          00FC0000    ; len of NK (KERNEL)
[15]  ENDIF
[16]
[17]    dwNKStart   00000000  NKSTART   FIXUPVAR
[18]    dwNKLen     00000000  NKLEN     FIXUPVAR
[19]
[20]  IF IMGAUTH
[21]    dwSKUDevIdLoc 00000000 00000000 DEVAUTH FIXUPVAR
[22]  ENDIF; IMGAUTH
```

FIG. 5

CUSTOMIZING BINARY CONTENT FILES

CROSS-REFERENCE TO RELATED APPLICATIONS

This application is a continuation of U.S. patent application Ser. No. 10/008,971, filed Dec. 6, 2001, and entitled "CUSTOMIZING BINARY CONTENT FILES", and which is incorporated herein by reference.

BACKGROUND OF THE INVENTION

1. The Field of the Invention

The present invention relates to customizing binary content files. More specifically, the present invention relates to systems, methods, and computer program products for updating values of variables in a binary content file without recompiling source code associated with the binary content file.

2. Background and Relevant Art

A computing device typically includes software programs that are executed to cause the computing device to behave in certain ways. Software programs often include one or more modules that cooperatively interact to perform the various functions associated with the software program. Each module may include one or more computer-executable instructions, that when executed in combination, cause a particular module function to be performed. Combinations of computer-executable instructions may result in complex software programs that control the operation of a computing device, as well as, simple programs, which display a single character of text. One or more related modules of computer-executable instructions are often included in a single file.

Conventionally, there are two well-known methods used for generating computer-executable instructions, namely "compiling" and "interpreting." To generate computer-executable instructions through compiling, a software module called a "compiler" receives "source code" and translates the source code into a binary content file. Binary content files often include instructions in the form of machine language, which is easily understandable by computing devices. Unfortunately, machine language consists entirely of numbers and is difficult, if not impossible, for humans to understand. As a result, most programmers utilize high-level programming languages such as BASIC or C++ to generate source code.

Compiling source code into a binary content file includes at least two basic processes and, depending on the computing device, programming language, and operating system, may include considerably more than two processes. The first basic process is translating source code into "object code." Different compiler modules may be designed to operate with different types of source code and translate the source code into object code. Object code is often very similar to machine language. However, one difference is that object code often includes symbolic addresses that are not directly understandable by a computing device. The second basic process, often called "linking," gives real values to all symbolic addresses thereby producing a binary content file that includes machine language.

As mentioned above, in addition to compiling, another method for generating computer-executable instructions is interpreting. In this lesser-used method, a computing device utilizes an interpreter for directly executing source code drafted in accordance with a high-level programming language. In essence, the machine language computer-executable instructions are generated and executed as the interpreter reads each line of source code.

Compiling and interpreting each have advantages and disadvantages. Binary content files generally require less storage space and run faster than interpreted programs. However, even minor changes to the source code associated with a binary content file may require completely recompiling an entire program. If the program is quite large, this may become time-consuming. On the other hand, modifications to interpreted high-level source code are automatically incorporated the next time the high-level source code is interpreted. However, execution of source code using an interpreter make take considerably more time that the execution of pre-compiled binary content.

Commercial software programs are almost solely distributed as binary content files due to the increased speed of execution, storage efficiency, and the lack of any requirement for an interpreter. Often, versions of a software program are developed and maintained for a wide variety of computing device platforms. Platforms may vary based on the hardware configuration of a computing device, how the hardware configuration should operate, or a written language that will be used with a computing device.

One type of binary content file is an image file that may be burned or flashed into a Read Only Memory ("ROM") chip. Often included in such image files are "boot instructions" that cause a computing device to be brought into an operational state (or "booted") when the computing device is powered on or reset. ROM chips are typically used to store boot instructions since the boot instructions will persist in memory when a computing device is powered down. The booting process is highly dependent on proper execution of the boot instructions, which are typically configured to operate with specific components included in a computing device.

Many similar computing devices require only minor variations to their boot instructions in order to boot properly. However, since image files are binary content files, separate versions of source code are typically maintained for each variation. It may also be desirable to configure the same computing device to boot differently in different operating environments. Separate versions of source code may be maintained for each distinct operating environment. For example, different source code may exist for an English language operating system as compared to a Japanese language operating system even though each operating system will run on the same computing device.

Additionally, if customization for a particular computing device is desired, different versions of binary content files need to be compiled for each different set of customizations. The workload associated with maintaining different versions of source code may substantially increase as the number of similar, yet different computing devices, configurations, and customizations increases. The problem is significantly compounded by the fact that a change to a configuration or customization must often be propagated to all modules that might be executed on the computing device. For example, a simple change in the configuration of system memory may need to be propagated to all modules that use system memory. If the change affects multiple languages, computing devices, and configuration settings, the amount of source code that must be edited and recompiled may be significant.

Maintaining large quantities of source code consumes the time resources and technical expertise of programmers. Additionally, since the large quantities of source code must often be recompiled, compiler resources may be used inefficiently. Consumption of programming resources and inefficient use of compiler resources both increase the cost associated with distributing a software program.

FIG. 1 illustrates some of the functional components that may be used in prior art methods for generating different versions of binary content files using a compiler. As shown, there are a number of versions of customized source code. Each version of customized source code performs substantially the same function and yet has minor variations from each of the other versions. Each version of customized source code corresponds to a customized binary content file. For example, customized source code 101A, 101B and 101C correspond to customized binary content files 103A, 103B and 103C, respectively. The three periods between each version of customized source code and customized binary content files represent that other versions (not shown) may exist. A software program may have numerous versions of customized source code and associated binary content files. Each version of customized source code must be compiled by a compiler such as compiler 102 to generate a corresponding customized binary content file.

One solution to the problem of increased maintenance requirements has been to compile a series of modules that may be interchanged in various ways to produce different behaviors. For example, a software program may include a plurality of language modules that are configured to display text in a variety of written languages. When the software program ships to a particular country, the language module associated with the country may be included in the software program.

While interchanging modules is beneficial, there are often still customizations that cannot be realized without recompiling. This is in part due to the level of granularity associated with interchanging functionality at the module level. For example, if new technology enables a mobile computing device to include additional system memory, an associated image file may need to be recompiled to make the mobile computing device compatible with the additional memory. The module may need to be recompiled because at the time the software program was developed, the new technology did not exist. Recompilation of an entire software program may be required even though a relatively small number of variables need to be changed to make the computing device compatible with the additional memory. This results in an inefficient use of compiler resources.

Therefore, what are desired are systems, methods, and computer program products for efficiently modifying binary content files without recompiling source code associated with the binary content file. What is further desired are systems, methods, and computer program products for modifying binary content files with increased granularity.

BRIEF SUMMARY OF THE INVENTION

The principles of the present invention provide for customizing binary content files without recompiling source code associated with the binary content files. A binary content file may be modified by directly updating the values of one or more variables included in the binary content file. Updating the values of variables may facilitate modified behavior when the binary content file is executed. It may be that updating the values of certain variables is known to produce a desired behavior when the binary content file is executed. Thus, updating the values of these certain variables may result in customization.

A binary content file includes variables that are assigned current values. The binary content file is received by a variable initialization module. The binary content file may be in a machine language format or other format that is directly executable by a computing device. Examples of binary content files include .DLL or .EXE files, as well as ROM image files that may be "flashed" or "burned into" a ROM memory chip. Variables that are assigned current values may include variables associated with address locations that have been assigned values by a compiler.

A script file includes references to updated values for one or more of the variables. The variable initialization module receives this script file. Script files may be generated by a user who has knowledge of the variables included in the binary content file. A user generating a script file may be aided by a scanner module, which scans the binary content file to identify variables included in the binary content file. References to updated values may include different types of values depending on the type of variable that is being referenced. For example, a script file may include a reference to an updated integer value when a variable has been defined as an integer type variable. References to updated values may include values that update memory address locations, authentication data, or stock keeping unit ("SKU") data, in order to customize execution of the binary content file.

A script file is processed to change the current values of one or more of the variables to the updated values for the one or more variables. This may include the variable initialization module processing the script file. If the script file references an updated value for a variable, the current value of the variable is overwritten with the updated value. Overwriting of variables is performed directly on the contents of the binary content file.

By modifying a binary content file directly, the recompilation of large quantities of source code may be avoided. This conserves compiler resources, as well as the time resources of technical personnel, resulting in lower costs associated with distributing a software program. Additionally, since variables may be modified individually, the level of granularity associated with customizations is significantly increased. This provides increased control over the types of customizations that may be realized.

Additional features and advantages of the invention will be set forth in the description that follows and, in part, will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5 illustrates an example of a script file.

DETAILED DESCRIPTION OF THE PREFERRED EMBODIMENTS

The present invention extends to systems, methods, and computer program products for modifying a binary content file without recompiling source code associated with the binary content file. Individual variables included in a binary content file may be modified to produce desired behavior when the binary content file is executed. A binary content file may be associated with one or more script files that reference variables included in the binary content file. The one or more script files may include updated values for the referenced variables.

In operation, a variable initialization module receives a binary content file, such as a ROM image file, that includes variables that are assigned current values. The variable initialization module also receives a script file associated with the binary content file. The script file includes references to updated values for variables included in the binary content file. The variable initialization module processes the script file to cause the updated values to be assigned to the variables included in the binary content file.

The embodiments of the present invention may comprise a special-purpose or general-purpose computer that includes various components, as discussed in greater detail below. Embodiments within the scope of the present invention may also include computer-readable media for carrying or having computer-executable instructions or data structures stored thereon. Such computer-readable media can be any available media that can be accessed by a general-purpose or special-purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general-purpose or special-purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which may cause a general-purpose computer, special-purpose computer, or special-purpose processing device to perform a certain function or group of functions.

Figure 1:
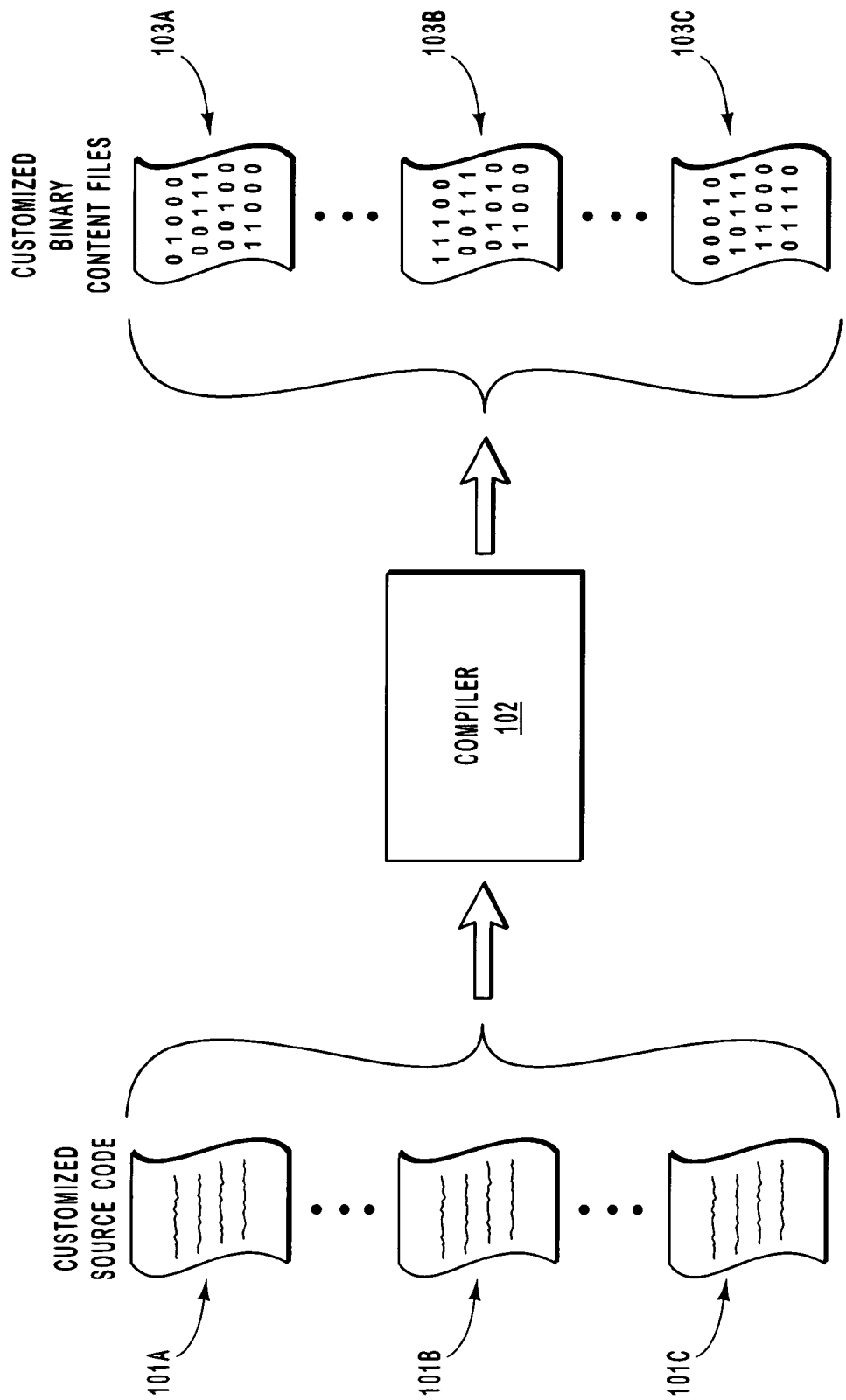
FIG. 1 illustrates the functional components of a prior art system for generating a plurality of versions of a binary content file using a compiler.
Figure 2:
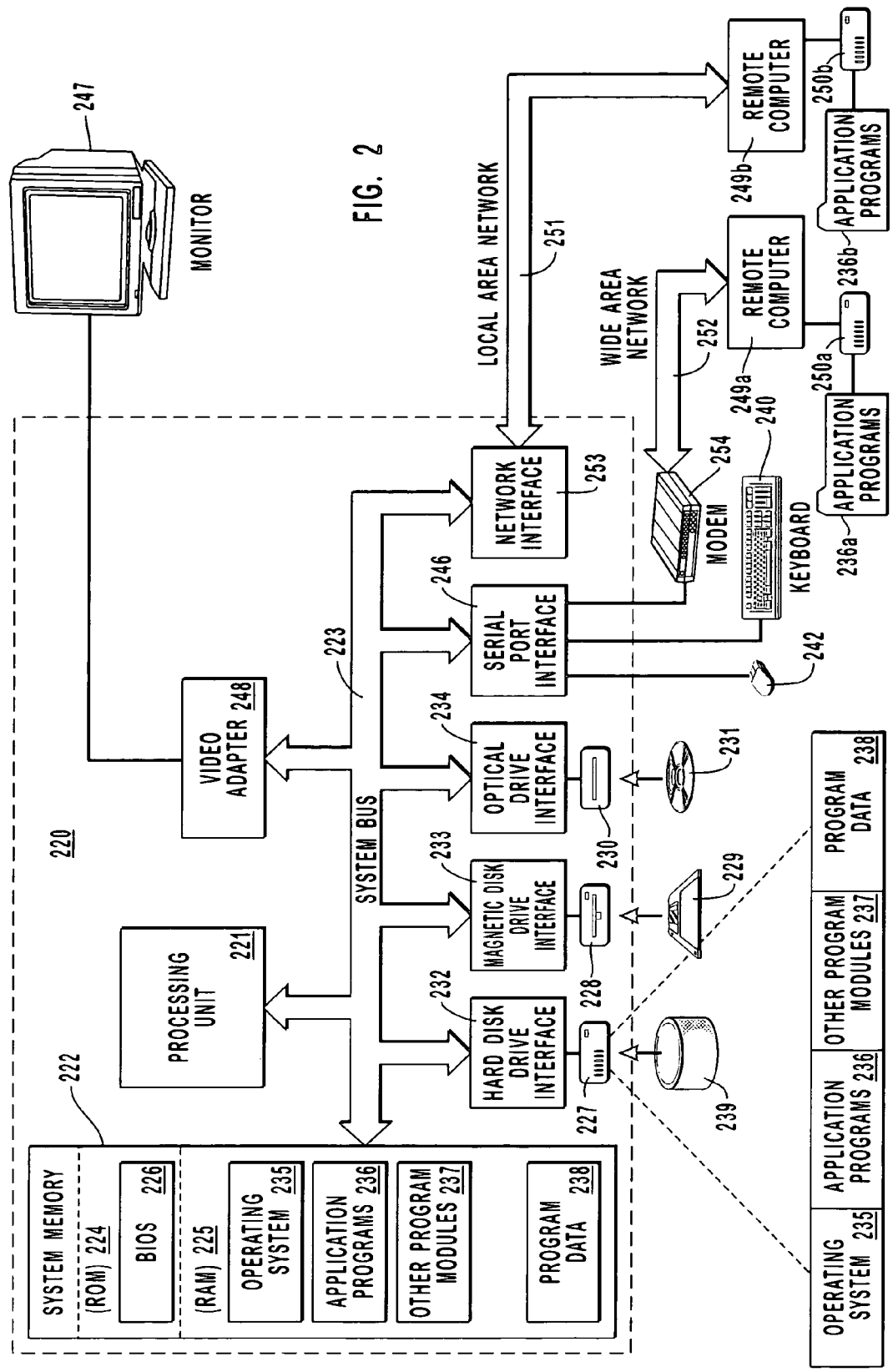
FIG. 2 illustrates an example processing system that provides a suitable operating environment for the present invention.

FIG. 2 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, mobile telephones, personal digital assistants ("PDAs"), multi-processor systems, microprocessor-based or programmable consumer electronics, network PCs, minicomputers, mainframe computers, and the like. The invention may also be practiced in distributed computing environments where local and remote processing devices are linked (either by hardwired links, wireless links, or by a combination of hardwired or wireless links) through a communications network and both the local and remote processing devices perform tasks.

With reference to FIG. 2, an example system for implementing the invention includes a general-purpose computing device in the form of a conventional computer 220, including a processing unit 221, a system memory 222, and a system bus 223 that couples various system components including system memory 222 to processing unit 221. System bus 223 may be any of several types of bus structures including a memory bus or memory controller, a peripheral bus, and a local bus using any of a variety of bus architectures. System memory may include read only memory ("ROM") 224 and random access memory ("RAM") 225. A basic input/output system ("BIOS") 226, containing the basic routines that help transfer information between elements within the computer 220, such as during startup, may be stored in ROM 224.

Computer 220 may also include a magnetic hard disk drive 227 for reading from and writing to a magnetic hard disk 239, a magnetic disk drive 228 for reading from or writing to a removable magnetic disk 229, and an optical disk drive 230 for reading from or writing to removable optical disk 231 such as a CD-ROM or other optical media. Magnetic hard disk drive 227, magnetic disk drive 228, and optical disk drive 230 are connected to system bus 223 by a hard disk drive interface 232, a magnetic disk drive-interface 233, and an optical drive interface 234, respectively. The drives and their associated computer-readable media provide nonvolatile storage of computer-executable instructions, data structures, program modules and other data for computer 220. Although the example environment described herein employs a magnetic hard disk 239, a removable magnetic disk 229 and a removable optical disk 231, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 239, magnetic disk 229, optical disk 231, ROM 224, or RAM 225, including an operating system 235, one or more application programs 236, other program modules 237, and program data 238. A user may enter commands and information into computer 220 through keyboard 240, pointing device 242, or other input devices (not shown), such as a microphone, joy stick, game pad, satellite dish, scanner, or the like. These and other input devices are often connected to processing unit 221 through a serial port interface 246 coupled to system bus 223. Alternatively, the input devices may be connected by other interfaces, such as a parallel port, a game port or a universal serial bus ("USB"). A monitor 247 or another display device is also connected to system bus 223 via an interface, such as video adapter 248. In addition to the monitor, personal computers typically include other peripheral output devices (not shown), such as speakers and printers.

Computer 220 may operate in a networked environment using logical connections to one or more remote computers, such as remote computers 249a and 249b. Remote computers 249a and 249b may each be another personal computer, a server, a router, a network PC, a peer device or other common network node. Remote computers 249a and 249b may include many or all of the elements described above relative to the computer 220, although only memory storage devices 250a and 250b and their associated application programs 236a and 236b are illustrated in FIG. 2. The logical connections depicted in FIG. 2 include a local area network (LAN) 251 and a wide area network (WAN) 252 that are presented here by way of example and not limitation. Such networking environments are commonplace in office-wide or enterprise-wide computer networks, intranets and the Internet.

When used in a LAN networking environment, computer 220 is connected to local network 251 through a network interface adapter 253 or similar adapter. When used in a WAN networking environment, computer 220 may include a modem 254, a wireless link, or other means for establishing communications over the wide area network 252, such as the Internet. Modem 254, which may be internal or external, is connected to system bus 223 via the serial port interface 246. In a networked environment, program modules depicted relative to computer 220, or portions thereof, may be stored in the remote memory storage device. It will be appreciated that the network connections shown are exemplary and other means of establishing communications over wide area network 252 may be used.

In accordance with the present invention, modules such as variable initialization modules used to facilitate modification of a binary content file, as well as associated program data such as binary content files and/or script files may be stored and accessed from any of the computer-readable media associated with computer system 220. For example, portions of program modules and associated program data may be included in operating system 235, application programs 236, other program modules 237 and/or program data 238, for storage on magnetic hard disk 239. Execution of program modules associated with modifying a binary content file may be performed in a distributed environment as previously described. For example, a variable initialization module included in a remote computing device, such as remote computer 249a or 249b, may facilitate modification of a binary content file included in a local processing device, such as computer 220, or vice versa.

Figure 3:
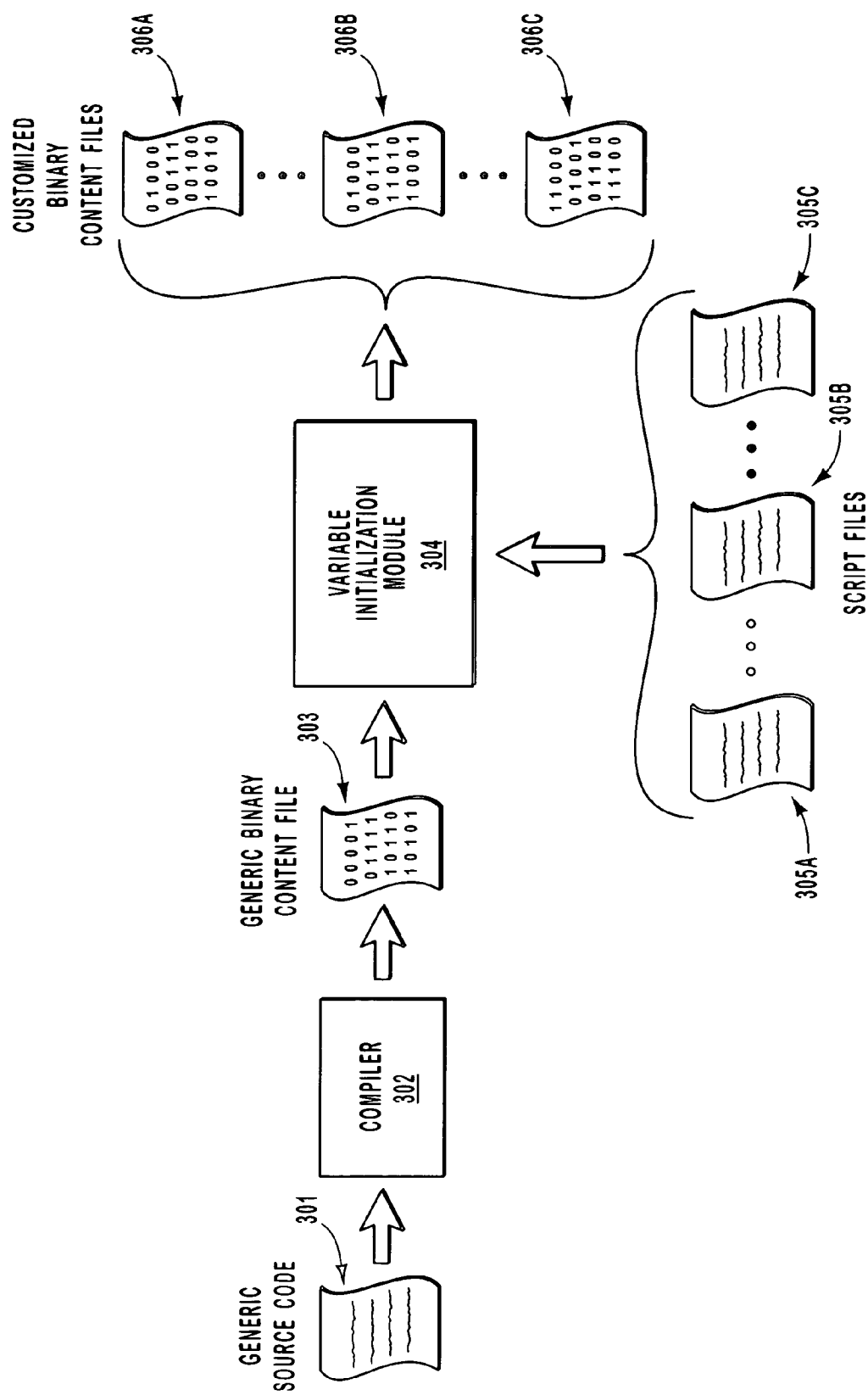
FIG. 3 illustrates an example of some of the functional components that may facilitate modification of a binary content file without recompiling source code associated with the binary content file.

Shown in FIG. 3 are some of the functional components that may be used to facilitate modifying a binary content file. Included in FIG. 3 are files that have text in a more easily understood format, such as source code associated with a high level computer language or plain text contained in script files. In FIG. 3, more easily understood text is represented by a series of horizontal lines. FIG. 3 also includes files that have computer-executable instructions in the form of machine language, such as binary content files. In FIG. 3, machine language is represented by horizontal rows of the numeric values "1" and "0".

In this description and in the following claims, a "compiler" is defined as one or more modules, either software, hardware or a combination thereof, that perform at least a portion of the function of translating source code into a binary content file.

Shown in FIG. 3 is generic binary content file 303. Generic binary content file 303 was generated as a result of compiler 302 translating generic source code 301 into machine language. Although represented as a single module, compiler 302 may include functionality to perform other functions associated with the compilation of source code. For example, compiler 302 may include a first compiler module to translate source code into object files (for example, into files with a .OBJ extension) and a second compiler module to translate object files into binary content files. Compiler 302 may also generate map files, which contain references to variables included in binary content files.

Figure 4:
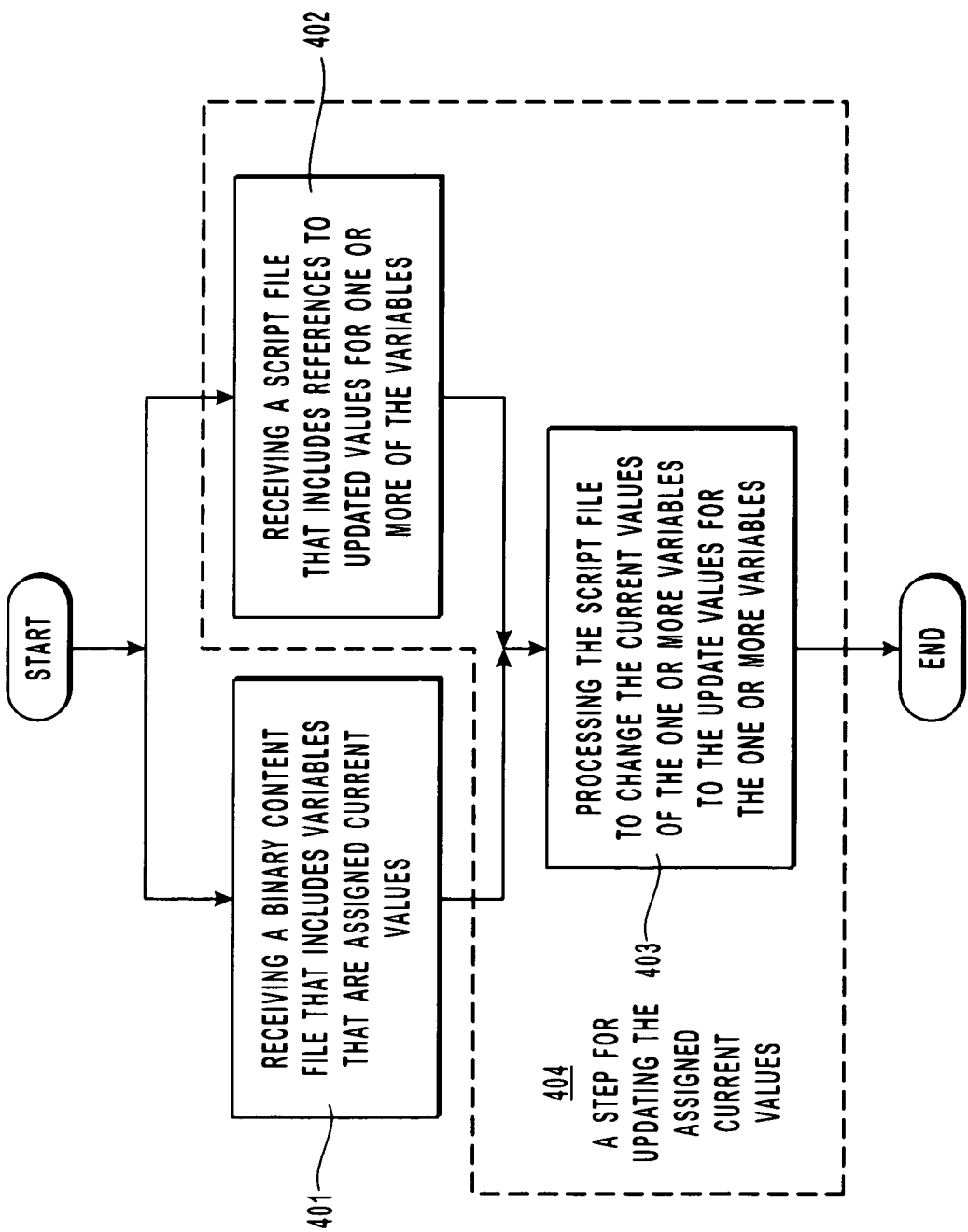
FIG. 4 is a flow diagram illustrating an example of a method for modifying a binary content file without recompiling source code associated with the binary content file.

Shown in FIG. 4 is a flow diagram illustrating a method for modifying a binary content file without recompiling source code associated with the binary content file. Shown in FIG. 5 is an example of a script file that may be used during practice of the present invention. The method in FIG. 4 will be discussed with reference to the functional components included in FIG. 3 and the example script file illustrated in FIG. 5.

As shown in FIG. 4, a binary content file is received that includes variables that are assigned current values (act 401). This may include generic binary content file 303 being received by variable initialization module 304. Generic binary content file 303 may be any file that includes computer-executable instructions that were generated by a compiler. Such a file may be a directly executable software module that performs functions by executing computer-executable instructions contained in the software module. Directly executable software modules may be represented by the ".EXE" or ".COM" extension.

A binary content file may also be in the form of a library of internal modules. Other external modules may link to or call the internal modules included in the library. Several external modules may simultaneously utilize the internal modules in such a library. Libraries of modules may be represented by the .EXE, ".DRV", or ".FON" extensions. Some libraries of modules may be termed as dynamic link libraries and may be represented by the ".DLL" extension.

A binary content file may also be in the form of an image file. Such an image file may be a ROM image file that will be "flashed" or "burned" into a ROM chip. Different ROM image files may be generated for different computing devices or operating systems.

It should be understood that the previously listed file formats and file extensions are only examples of the types of binary content files that may be modified without recompiling associated source code. Various computing devices and operating systems may be associated with a large number of other file extensions and file formats that are representative of binary content files, whether now existing or to be developed in the future. It would be apparent to one skilled in the art, after having reviewed this description, that the principles of the present invention provide for modifying essentially any type of binary content file, regardless of format or extension, without recompiling associated source code.

Variables included in a binary content file may be used to represent different data types, for example, numerical integer, numeric floating point, logical, character, character string, memory address, or the like. Variables may also be used to represent data types that are generated by a developer during the creation of a software module. Variables in a binary content file may be assigned current values by a developer during creation of a software module or may be assigned by a compiler during the compilation of source code associated with the binary content file. Variables may be associated with the operation of peripheral hardware included in a computing device, with stock keeping units ("SKUs"), with authentication information, or with virtually any other hardware or software module that may use stored data during operation.

A step may be performed for updating the assigned current values (step 404). This may include performing the corresponding acts of receiving a script file that includes references to updated values for one or more of the variables (act 402) and processing the script file to change current values to updated values (act 403). In some embodiments, variable initialization module 304 may receive a script file that includes references to updated values for one or more of the variables included in generic binary content file 303. In FIG. 5, lines 17, 18, and 21 illustrate references to updated values.

Different script files may be created to cause generic binary content file 303 to be modified in different ways and thus result in different behavior when executed. FIG. 3 illustrates a plurality of script files. Each script file corresponds to a customized binary content file. For example, script file 305A, 305B and 305C correspond to customized binary content files 306A, 306B and 306C, respectively. The three periods between each script file and between versions of customized binary content files represent that other script files or versions (not shown) may exist.

Script files may include logic for determining when to update a variable and what value the variable will be updated to. Script files may also include internal variables that are used to determine when external variables contained in a binary content file should be updated and to what value. In the script file illustrated in FIG. 5, numerical values are represented in a hexadecimal format. However, the present invention may be practiced where numerical values are represented in essentially any numbering system. The script in FIG. 5 also includes informational comments that will be ignored when the script is processed. Informational comments include text that follows a semicolon.

Illustrated at lines 01 through 06 in FIG. 5 is a conditional statement. If "IMGAUTH" is true, then the internal variable "DEVAUTH" is set to 802B0000 and the internal variable "DEVAUTHLEN" is set to 00000080. It may be that IMGAUTH is true if the binary content file to be modified includes authentication information. DEVAUTH may be the memory location of the start of a device's authentication information and DEVAUTHLEN may be the length in bytes of the device's authentication information. At line 05, an amount of memory equal to the length of the device's authentication information may be reserved.

At line 08 the internal variable "NKSTART" is set to 80004000. This may be an address location that a computing device will automatically execute instructions from, for example, when the computing device boots up. At lines 10 through 12 and lines 13 through 15, it is illustrated how a first internal variable may be set to one of two different values depending on the logical value of a second internal variable. If the logical value of "IMG32BIT" is true, "NKLEN" is set to 01FC0000. If the logical value of IMG32BIT is false, NKLEN is set to 00FC0000.

The internal variable IMG32BIT may be representative of a variety of varied configuration settings such as, for example, a type computing device, an amount of system memory included in a computing device, or an operating system associated with a computing device. However, practice of the present invention is not limited to such configurations settings. It would be apparent to one skilled in the art, after having reviewed this description, that an internal variable may be representative of any configuration setting that is associated with hardware or software modules included in a binary content file. For clarity, assume that if IMG32BIT is true, a binary content file will be executed on a computing device with an increased amount of memory. At line 11, NKLEN is set to 01FC0000, as opposed to line 14 where NKLEN is set to 00FC0000. This may represent that a computing device with an increased amount of memory will execute a greater number of instructions and thus more memory is needed to store the instructions.

At line 17, the external variable "dwNKStart" is set equal to 80004000 (the value of NKSTART). At line 18 "dwNKLen" is set to either 00FC0000 (if a binary content file is to be executed on a computing device with increased memory), or 00FC0000 (if a binary content file is to be executed on a computing device without increased memory). At lines 20 through 22 the external variable "dwSKUDevIdLoc" is set to 802B0000 (the value of DEVAUTH) if the logical value of IMGAUTH is true.

In FIG. 5, references to updated values for one or more variables are the values of dwNKStart, dwNKLen, and dwSKUDevIdLoc. These represent variables in a binary content file that may be directly updated via the execution of the script file illustrated in FIG. 5. Identification of variables included in a binary content file may result from a developer that is aware of the variables, from documentation associated with a binary content file, or from scanner modules that scan binary content files to identify variables. Identification of variables may also be facilitated by the use of a map file. Map files show the structure of a binary content file after it has been compiled. Map files may list every variable in a binary content file, as well as, memory addresses associated with the variables. A compiler may be configured to generate a map file as a by-product of compiling a portion of source code.

In act 403, the script file may be processed to change the current value of the one or more variables to the updated values for the one or more variables. This may include variable initialization module 304 processing a script file to generate a customized binary content file. For example, variable initialization module 304 may process script file 305A to generate customized binary content file 306A. Variable initialization module 304 may scan generic binary content file 303 to locate variables referenced in a script file, for example, the script file illustrated in FIG. 5. When a variable is located, the value of the variable is updated by overwriting the current value in the binary content file with the updated value included in the script file.

Through the use of conditional statements, the functionality of a plurality of script files may be combined into a single script file. Thus in some embodiments, the functionality of a plurality of the script files included in script files 305A through 305C may be combined into a single script file. Additionally, depending on the values of internal variables, a single script file may be used to generate a plurality of versions of customized binary content files. For example, logical values associated with an "if" statement may be varied to produce different versions of a binary content file. Thus, in some embodiments, a single script file may be used to generate a plurality of the customized binary content files included in customized binary content files 306A through 306C.

The use of script files reduces the volume of information that is processed during the generation of customized binary content files. This reduction may be significant if the volume of source code is large compared to the number of variables that will have their values updated. For example, changing one address location in hundreds of lines of source code may be more easily realized using a script file, as opposed to recompiling multiple versions of the source code. This results in conservation of compiler resources and reduces the workload associated with maintaining different versions of a binary content file. Additionally, since binary content files may be modified at the variable level, the granularity of controlling the behavior of binary content files is greatly increased.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. A computer program product for implementing a method for controlling a computing system, the computer program product comprising physical computer storage media containing computer-executable instructions for implementing a method for customizing a binary content file stored at the computing system without recompiling source code associated with the binary content file so as to modify the behavior of the binary content file when the binary content file is executed at a destination computing system, and wherein the method comprises:
    at a computing system performing an act of translating an object file compiled from source code into one or more compiled binary content files;
    an act of receiving at a computing system for storage one or more compiled binary content files that each includes one or more variables that are assigned current values;
    an act of preparing at a computing system one or more non-binary script files that each include one or more references to updated values for one or more of the variables in one or more of the compiled binary content files;
    inputting for storage at the computing system at which the one or more compiled binary content files are stored the prepared script files, and then performing at a variable initialization module of the computing system an act of processing the one or more non-binary script files to change the current values of one or more variables to updated values for the one or more variables in one or more of the compiled binary content files; and
    at the computing system where the one or more compiles binary content files are stored, using the variable initialization module to update the one or more compiled binary content files with the change to current values of the one or more variables obtained from the one or more script files without having to recompile the updated binary content files.

2. The computer program product as recited in claim 1, wherein the act of receiving the one or more compiled binary content files that each include one or more variables that are assigned current values comprises the following:
    an act of receiving a dynamic link library.

3. The computer program product as recited in claim 1, wherein the act of receiving the one or more compiled binary content files that each include one or more variables that are assigned current values comprises the following:
    an act of receiving an image file that was designed to be stored in read only memory.

4. The computer program product computing device as recited in claim 1, wherein the act of preparing at a computing system one or more non-binary script files that each include one or more references to updated values for one or more of the variables in one or more of the compiled binary content files comprises the following:
    an act of preparing at least one of the script file to include references to updated values for one or more of the variables that were identified through at least one of an associated map file and a scanner module.

5. The computer program product as recited in claim 1, wherein the act of preparing at a computing system one or more non-binary script files that each include one or more references to updated values for one or more of the variables in one or more of the compiled binary content files comprises the following:
    an act of preparing at least one of the script file to include one or more conditional statements for selecting appropriate references to updated values for one or more variables.

6. The computer program product as recited in claim 1, wherein the act of preparing at a computing system one or more non-binary script files that each include one or more references to updated values for one or more of the variables in one or more of the compiled binary content files comprises the following:
    an act of preparing at least one of the script file to include references to updated values for one or more variables that facilitate configuring the binary content file for operation on the destination computing system.

7. The computer program product as recited in claim 1, wherein the act of preparing at a computing system one or more non-binary script files that each include one or more references to updated values for one or more of the variables in one or more of the compiled binary content files comprises the following:
    an act of preparing at least one of the script file to include references to updated values for one or more variables associated with at least one of stocking keeping unit information and authentication information.

8. The computer program product as recited in claim 1, wherein the act of preparing at a computing system one or more non-binary script files that each include one or more references to updated values for one or more of the variables in one or more of the compiled binary content files comprises the following:
    an act of preparing at least one of the script file to include references to updated values for one or more variables associated with hardware components included in the destination computing system.

9. The computer program product as recited in claim 1, wherein the act of preparing at a computing system one or more non-binary script files that each include one or more references to updated values for one or more of the variables in one or more of the compiled binary content files comprises the following:
    an act of preparing at least one of the script file to include references to updated values for or one or more variables associated with memory addresses.

10. The computer program product as recited in claim 1, wherein the act of processing the one or more non-binary script files to change the current values of one or more variables to updated values for the one or more variables in one or more of the compiled binary content files comprises the following:
    an act of directly overwriting the current values of the one or more variables included in the one or more compiled binary content files with the updated values of the one or more variables included in at least one non-binary script file.

11. The computer program product as recited in claim 1, wherein the act of processing the one or more non-binary script files to change the current values of one or more variables to updated values for the one or more variables in one or more of the compiled binary content files comprises the following:

an act of processing at least one non-binary script file to change the current values of the one or more variables to the updated values for the one or more variables to configure the one or more compiled binary content files for operation on a destination computing system.

12. The computer program product as recited in claim 1, wherein the act of processing the one or more non-binary script files to change the current values of one or more variables to updated values for the one or more variables in one or more of the compiled binary content files comprises the following:

an act of processing at least one non-binary script file to change the current values of one or more variables associated with stocking keeping unit information to updated values for the one or more variables.

13. The computer program product as recited in claim 1, wherein the act of processing the one or more non-binary script files to change the current values of one or more variables to updated values for the one or more variables in one or more of the compiled binary content files comprises the following:

an act of processing at least one non-binary script file to change the current values of one or more variables associated with authentication information to updated values for the one or more variables.

* * * * *